Nov. 14, 1944.     A. F. HICKMAN     2,362,483
TORSION ROD SPRING SUSPENSION
Filed Feb. 26, 1942     2 Sheets-Sheet 2
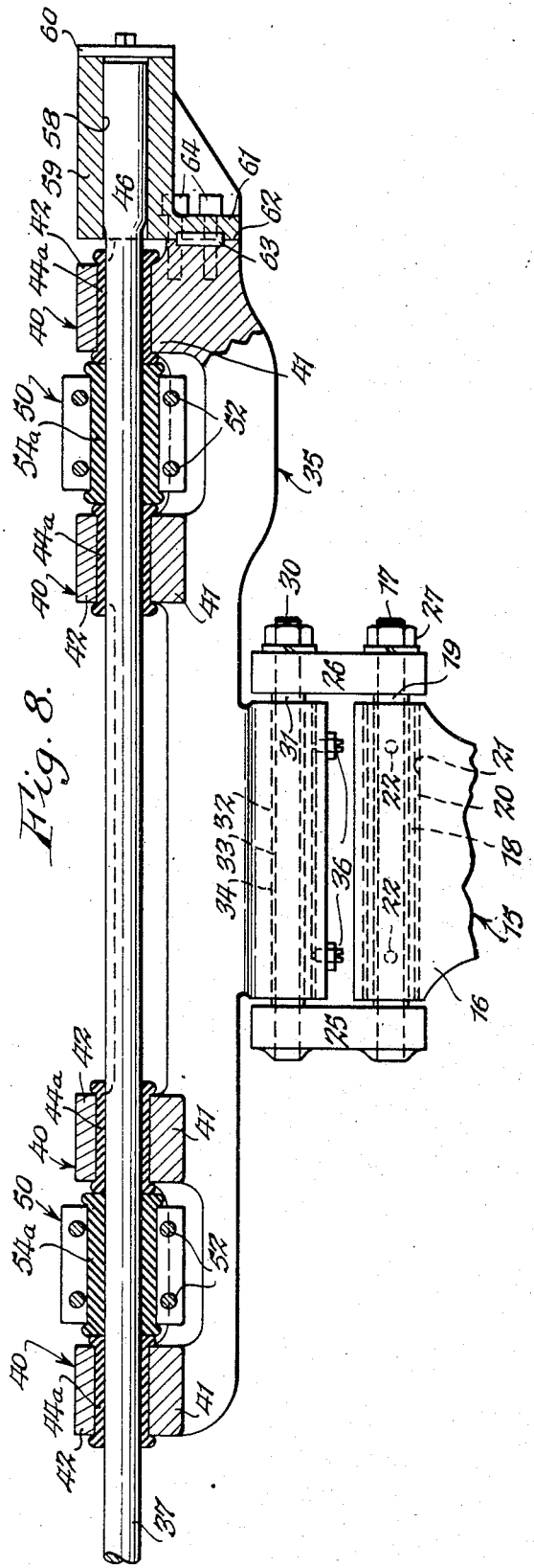
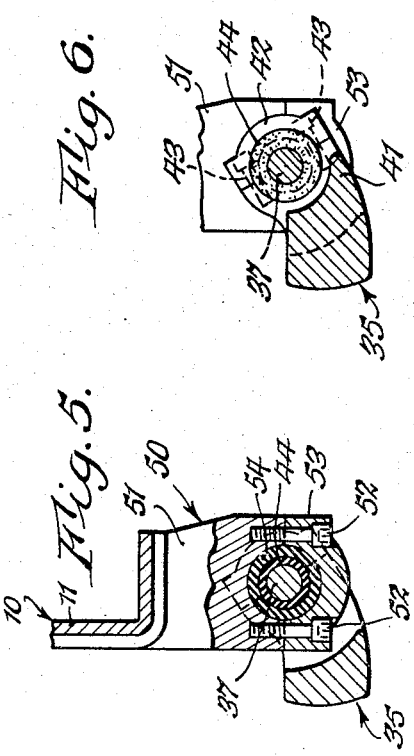
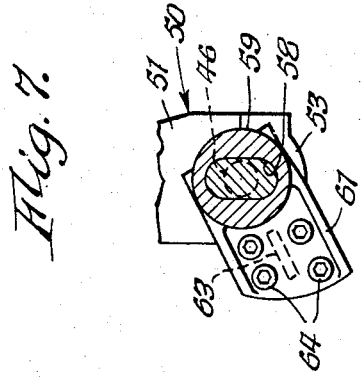
INVENTOR
Albert F. Hickman
BY
Popp and Popp
ATTORNEYS Patented Nov. 14, 1944

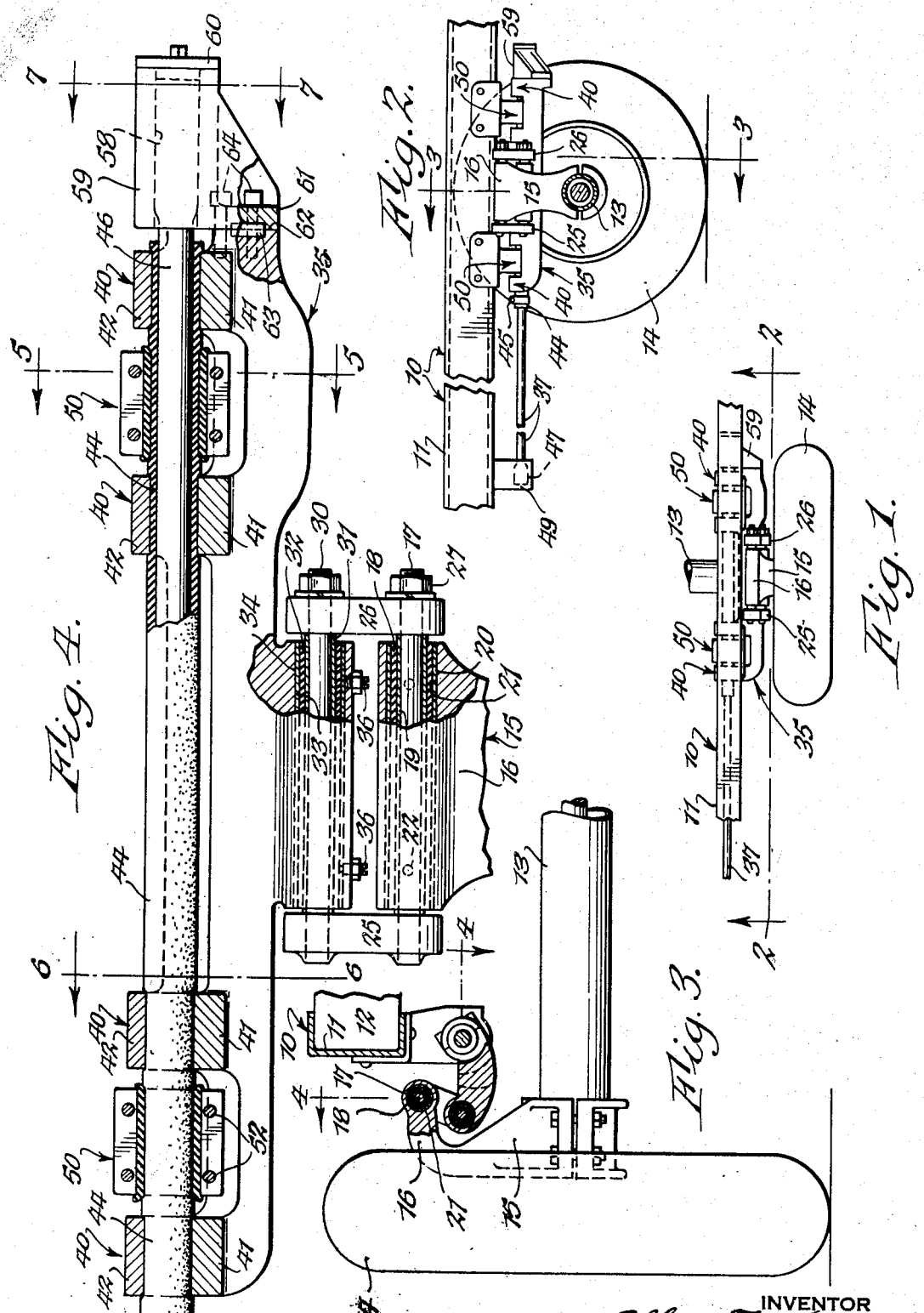

2,362,483

UNITED STATES PATENT OFFICE 2,362,483

TORSION ROD SPRING SUSPENSION

Albert F. Hickman, Eden, N. Y., assignor to Hickman Pneumatic Seat Co., Inc., Eden, N. Y., a corporation of New York Application February 26, 1942, Serial No. 432,405

10 Claims. (Cl. 267—57)

This invention relates to a torsion rod spring suspension for vehicles and more particularly to such a spring suspension in which the axle is permitted to move against a geometric resilient resistance, both laterally and vertically, relative to the vehicle frame, both when the vehicle has a low percentage of load variation and also when it has a high percentage of load variation. While the invention is more particularly described in connection with a highway vehicle, it is also applicable for use on other land vehicles, such as railroad cars.

This application is a continuation in part of my copending application Ser. No. 319,097, filed February 15, 1940, now Patent No. 2,290,181, granted July 21, 1942, for Tandem axle suspension and is a companion application to my application Ser. No. 432,404, filed of even date herewith, now Patent No. 2,333,650, granted November 9, 1943.

One of the objects of the invention is to reduce and cushion the lateral impacts from the axle against either the frame or the springs of a vehicle which is subject to either a high or a low percentage of load variation.

Another object is to provide such a spring suspension in which the movements of the axle both vertically and laterally, are opposed by a geometric resilient resistance and in which the movements of the axle are opposed by a resilient force of such nature as to take care of a high percentage of load variation so that, regardless of whether the vehicle is loaded or unloaded, no undue end thrusts are imposed on the various pivotal connections which connect the axle to the frame.

Another object is to provide such a torsion rod spring suspension in which geometric resilient resistance is obtained in a compact structure which requires no lubrication.

Another object of the invention is to provide such a suspension in which the distribution of the load from the axle to the frame is at a plurality of points and in which all drive and brake torque is resisted by the linkage of the suspension itself so as to avoid the necessity of radius rods or like mechanism.

Another object of the invention is to avoid all leaf spring friction by the use of torsion rods and a linkage connection between the frame and the axle. With heavy vehicles supported on leaf springs, the leaf spring friction is extremely high when the vehicle is unloaded so as to render the vehicle practically unsprung.

Another object of the invention is to vary materially reduce the weight of the tandem axle suspension as compared with conventional leaf spring suspensions now in use. This is accomplished by substituting short levers and light torsion rods for the conventional leaf springs and by the elimination of cross shaft stabilizers.

Another object of the invention is to provide a spring suspension in which the torsion rods, in addition to serving as the spring means between the axle and the frame, also serve as journal pins for pivotally connecting the axles to the frame.

Another object of the invention is to include bushings of rubber or other soft, resilient plastic material in the bearings for the torsion rods and the links and levers pivotally connecting the torsion rods with the axles, thereby to eliminate the necessity for lubrication, and also to so construct the rubber bushings as to prevent the entrance of dirt or other abrasives which would reduce the efficiency of the rubber bushings.

Other objects of the invention and practical solutions thereof are disclosed in detail in the following description and drawings, in which drawings:

Fig. 1 is a fragmentary top plan view of the frame of a vehicle supported on an axle by a torsion rod spring suspension embodying my invention.

Fig. 2 is a fragmentary vertical longitudinal section, taken on line 2—2, Fig. 1.

Fig. 3 is an enlarged fragmentary transverse section thereof, taken generally on line 3—3, Fig. 2.

Fig. 4 is a laid-out section through the linkage pivotally connecting each end of each axle with the frame, this section being taken generally on line 4—4, Fig. 3.

Figs. 5, 6 and 7 are enlarged fragmentary transverse sectional views, taken on the correspondingly numbered lines of Fig. 4.

Fig. 8 is a view similar to Fig. 4 showing a modified form of the invention.

The invention is shown in connection with a highway vehicle, although the invention is also applicable to railroad cars or other land vehicles. The frame 10 of the vehicle is shown as including a pair of longitudinal side frame bars 11 suitably joined together transversely by cross frame bars 12 in the usual and well known manner. This frame is shown as supported by an axle 13 which is supported by a pair of wheels 14, these wheels being rotatably secured to the axles.

To each end of each axle is secured an axle bracket 15 which is fast to the axle and extends upwardly therefrom and is formed to provide an inwardly projecting arm or horn 16 at its upper end. At its upper inner extremity, this axle bracket 15 pivotally carries an axle pivot pin 17 which, as best shown in Fig. 4, is preferably mounted in a bushing 18 of rubber or other soft, resilient plastic material having a tubular metal lining sleeve 19 which is tightly fitted around the axle pivot pin 17 and has a tubular metal outer sleeve 20 which is fitted in a bore 21 in the upper inner extremity of the axle bracket 15, this outer sleeve 20 being held against rotation in the bore 21 by set screws 22 or in any other suitable manner. The rubber connection between each axle bracket 15 and its axle pivot pin 17 permits the axle pivot pin 17 to oscillate in the axle bracket 15 the necessary extent to permit vertical and lateral movement of each axle relative to the frame 10 as hereinafter described and avoids the necessity of providing a bearing which requires lubrication or which may become noisy. As best shown in Fig. 4 the inner metal lining sleeve 19 of the rubber bushing for the axle pivot pins 17 is extended outwardly beyond the front and rear extremities of the axle bracket 15 and forms a spacer for a pair of shackles 25 and 26. The shackle 25 is welded to the corresponding end of the axle pivot pin 17 and one end of the shackle 26 is secured to the opposite threaded end of the axle pivot pin 17 by means of a nut 27.

The other ends of the shackles 25 and 26 are similarly secured to the opposite ends of a crank arm pivot pin 30, this crank arm pivot pin 30 being tightly fitted in the inner metal lining sleeve 31 of a bushing 32 of rubber or other soft, resilient plastic material with this inner metal lining sleeve 31 forming a spacer for the two shackles 25 and 26. The rubber bushing 32 is surrounded by an outer metal sleeve 33 which is secured in the bore 34 at the outer end of a crank arm 35 by means of set screws 36. This crank arm 35 is rotatably mounted on a torsion rod 37 which is in turn journaled in bearings secured to the main frame 10 of the vehicle, the torsion rod 37 thereby serving both as the springing means for the suspension and also as the journal pin for the crank arm 35.

For this purpose each crank arm 35 is extended a substantial extent lengthwise of the vehicle and each crank arm is provided at its front and at its rear end with a pair of spaced bearings 40 which embrace the corresponding parts of the companion torsion rod 37. Each of these bearings 40 is shown, as best illustrated in Figs. 4 and 6, as comprising a half bearing 41 formed in the crank arm 35 and a half bearing cap 42 secured to the half bearing 41 by screws 43 and embracing a bushing 44 of rubber or other soft, resilient plastic material which is tightly compressed against the torsion rod 37.

In the form of the invention shown in Figs. 1-7, the same tube of rubber serves as the rubber bushing 44 for each of the crank arm bearings 40, this rubber sleeve being secured to the torsion rod 37 by a ring clamp 45 and extending through each of the bearings 40, as best shown in Fig. 4. By this means dirt or other abrasive material is prevented from entering the rubber bushed bearings 40 and hence the life of these rubber bushed bearings is materially increased. The use of the rubber sleeve 44 as the bushing for each of the bearings 40 permits the necessary swinging movement of the crank arm 35 about the torsion rod 37 as an axis and at the same time avoids the necessity for lubrication and the liability for squeaks. At the same time this sleeve 44 permits the necessary twisting movement of the torsion rod 37, this torsion rod twisting to a progressively greater degree as it approaches its "live" end 46. The opposite or "dead" end 47 is restrained against rotation and for this purpose it is shown as deformed so as to be out of round and fitted in a correspondingly shaped socket of a socket member 49 which can be secured to the vehicle frame in any suitable manner. Thus, the angular movement of the torsion rod 37 in providing the necessary spring resistance for the suspension is much greater at the right hand bearing 40, as viewed in Fig. 4, than at the left hand bearing 40, as viewed in this same figure, this progressive increasing twisting of the torsion rod 37 as it approaches its anchored end 47 being permitted by the use of the rubber sleeve 44 as the bushings for the various bearings 40.

Between the front pair of bearings 40 of the crank arm 35 and between its rear pair of bearings 40, the torsion rod 37 is secured to the frame 10 of the vehicle by a bearing indicated generally at 50. As best shown in Fig. 5, each of these bearings comprises a bracket 51 which is secured to the corresponding longitudinal side bar 11 of the frame 10 and formed on its underside to provide a half bearing socket. To the underside of each bracket 51, by means of screws 52 or in any other suitable manner, is secured a half bearing cap 53 which compresses a rubber bushing 54 into firm engagement with the corresponding part of the rubber sleeve 44 which forms the bushings for the bearings 40, the bushings 44 and 54 being thereby pressed into firm engagement with the corresponding part of the torsion rod 37, the torsion rod being thereby permitted to oscillate in the bearings 50. The use of the two rubber bushings 44 and 54 in the main supporting bearings 50 also permits the progressive twisting of the torsion rod 37 to provide the spring resistance for the spring suspension, the necessarily greater degree of twisting movement in the right hand main bearing 50, as viewed in Fig. 4, as compared with the left hand bearing 50 in this figure, being permitted by the use of rubber bushings in these bearings. The rear extremity of the torsion rod 37 is positively connected to the rear extremity of the crank arm 35 so that the oscillating movement of the crank arm 35 is transmitted directly to the rear or "live" end of the torsion rod 37. For this purpose the rear or "live" end 46 of the torsion rod 37 is preferably ovalled in the manner set forth in my Patent No. 2,213,004 granted August 27, 1940, for a Torsion rod mounting. This ovalled rear end of the torsion rod is fitted in a correspondingly shaped bore 58 provided in a socket member 59, the rear end of this bore being preferably closed by a removable cap 60. As best shown in Figs. 4 and 7, the socket member 59 is provided with a laterally extending arm 61 which is fitted against the flat end face 62 at the rear of the crank arm 35. A radially extending key 63 is preferably inserted in keyways provided in these parts and the arm 61 of each socket 59 is secured to the end of the crank arm 35 by a plurality of screws 64 or in any other suitable manner. It will therefore be seen that each socket member 59 is fast to the rear end of the corresponding crank arm 35 and that therefore the oscillation of the crank arm 35 through its bearing 40 effects a corresponding twisting of the live end 46 of its torsion rod, this twisting movement of its torsion rod being permitted by the bearings 50.

The opposite or "dead" end 47 of the torsion rod 37 is also preferably ovalled in the manner set forth in my Patent No. 2,213,004 and is shown as fitted into a correspondingly ovalled bore of the socket member 49, this socket member being shown as suitably secured to the corresponding side bar 11 of the frame 10.

In the operation of the suspension, the upward movement of one end of the axle 13 through its shackles 25 and 26 swings the outer end of its crank arm 35 upwardly, this crank arm rotating about its bearings 40 which pivotally support the crank arm on its torsion rod 37, this torsion rod being in turn supported adjacent the bearings 40 by its bearings 50 which are secured to the main frame 10 of the vehicle. These bearings 40 and 50 are bushed by the common rubber sleeve 44 which is distorted to permit the necessary movement of the crank arm 35, and the bearings 50 supporting the torsion rod 37 are additionally bushed with short rubber bushings 54, these additional rubber bushings 54 being provided to accommodate the increased force imposed upon the bearings 50 as compared with the bearings 40. While a small twisting force is directly applied to the torsion rod 37 through the rubber bushed bearings 40, the principal connection between each crank arm 35 and the torsion rod 37 is through the socket member 59 secured to one end of the crank arm 35 and which has an ovalled socket 58 receiving the ovalled "live" end 46 of the torsion rod 37. Through the socket member 59 it will be seen that the upward movement of the axle 13 will twist the torsion rod 37. This torque of the torsion rod 37 is transmitted to the "dead" end 47 of the torsion rod which is shown as anchored in the socket member 49 secured to the frame 10 of the vehicle. It will therefore be seen that the torsion rods provide the necessary resilience in the suspension forming the subject of this invention.

It will be noted that the shackles 25 and 26 are inclined upwardly and inwardly from the crank arm pivot pins 17 to the axle pivot pins 30. This upward and inward inclined arrangement of the shackles tends to cause each axle to centralize itself in a direction transverse of the frame and enables the action of gravity to geometrically and resiliently resist any such movement of the axle away from its central position. This permits the vehicle frame 10 to move substantially straight ahead despite a certain amount of lateral movement of the axle. This arrangement of the shackles further provides high and wide pivot positions which provides increased stability in that it provides effective spring centers which can be as wide or wider than the track of the vehicle. Further, this arrangement of the shackles reduces sidesway, the high and wide pivot positions, together with the upward and inward slant of the shackles providing a suspension in which the frame 10 is more nearly suspended than mounted. Other important advantages which flow from the inclined arrangement of the shackles shown are the reduction in the possibility of wheel tramp and in the elimination of the need for anti-body roll devices, such as torsion bar stabilizers.

In the form of the invention illustrated in Fig. 8, the torsion rod and crank arm, together with the bearings for these parts, are identical with the form of the invention shown in Figs. 1–7 and the same reference numerals have therefore been applied.

Instead, however, of the continuous sleeve 44 forming the rubber bushing for each of the crank arm bearings 40, as in the form of the invention shown in Figs. 1–7, these rubber bushings 44a are shown as individually provided in each of the bearings 40 around the torsion rod 37. Similarly, instead of the continuous sleeve 44, and auxiliary rubber bushings 54 for the bearings 50 which support the torsion rod from the main frame in the form of the invention shown in Figs. 1–7, an individual rubber bushing 54a is provided for each of these bearings. The rubber bushings 54a for the bearings are thicker than the rubber bushings 44a for the bearings 40 because of the heavier load which is imposed upon these bearings 50.

From the foregoing it will be seen that the present invention provides a spring suspension attaining the objects and having the many operating and structural advantages set forth and at the same time provides a suspension in which a separate journal pin for the crank arms is eliminated, the live end of the torsion rod itself being used in substitution for such a journal pin and the necessary bearings for such novel structure being bushed with rubber or other soft, resilient plastic material so as to avoid the necessity for lubrication and the likelihood of any noise developing, the rubber bushings at the same time permitting the free relative movement of the different parts of the torsion rod.

I claim as my invention:

1. A vehicle spring suspension, comprising a frame, an axle having a wheel journaled thereon, a bearing mounted on said frame adjacent said axle with its axis extending generally at right angles to said axle, a torsion rod having one end directly journaled in said bearing, means mounted on said frame adjacent to and restraining the rotation of the opposite end of said torsion rod, a crank arm having a pair of bearings directly journaled on said torsion rod on opposite sides of said first bearing, means operatively connecting said crank arm to said one end of said torsion rod, and means pivotally connected to said crank arm and to said axle.

2. A vehicle spring suspension, comprising a frame, an axle having a wheel journaled thereon, a bearing mounted on said frame adjacent said axle with its axis extending generally at right angles to said axle, a torsion rod having one end directly journaled in said bearing, means mounted on said frame adjacent to and restraining the rotation of the opposite end of said torsion rod, a crank arm having a pair of bearings directly journaled on said torsion rod on opposite sides of a vertical plane extending through the axis of said axle, means operatively connecting said crank arm to said one end of said torsion rod, and means pivotally connected to said crank arm and to said axle.

3. A vehicle spring suspension, comprising a frame, an axle having a wheel journaled thereon, a pair of coaxial bearings mounted on said frame adjacent said axle in spaced relation to each other with the axis of said bearings extending generally at right angles to said axle, a torsion rod having one end directly journaled in said pair of bearings, means mounted on said frame adjacent to and restraining the rotation of the opposite end of said torsion rod, a crank arm having a pair of spaced bearings each journaled on said torsion rod adjacent one of said first pair of bearings, means operatively connecting said crank arm to said one end of said torsion rod and means pivotally connected to said crank arm and to said axle.

4. A vehicle spring suspension, comprising a frame, an axle having a wheel journaled thereon, a pair of coaxial bearings mounted on said frame adjacent said axle in spaced relation to each other with the axis of said bearings extending generally at right angles to said axle, a torsion rod having one end directly journaled in a said pair of bearings, means mounted on said frame adjacent to and restraining the rotation of the opposite end of said torsion rod, a crank arm having two pairs of bearings each pair being directly journaled on said torsion rod adjacent one of said first pair of bearings, means operatively connecting said crank arm to said one end of said torsion rod, and means pivotally connected to said crank arm and to said axle.

5. A vehicle spring suspension, comprising a frame, an axle having a wheel journaled thereon, a bearing block mounted on said frame adjacent to said axle and formed to provide a cylindrical bore with its axis extending generally at right angles to said axle, a torsion rod having one end arranged in said cylindrical bore, means mounted on said frame adjacent to and restraining the rotation of the opposite end of said torsion rod, a crank arm having a bearing socket surrounding said torsion rod adjacent said bearing block, a sleeve of a soft, resilient plastic material surrounding said torsion rod and having one part arranged in said cylindrical bore and another part arranged in said socket, mean operatively connecting said crank arm to said one end of said torsion rod, and means pivotally connected to said crank arm and to said axle.

6. A vehicle spring suspension, comprising a frame, an axle having a wheel journaled thereon, a bearing block mounted on said frame adjacent to said axle and formed to provide a cylindrical bore with its axis extending generally at right angles to said axle, a torsion rod having one end arranged in said cylindrical bore, means mounted on said frame adjacent to and restraining the rotation of the opposite end of said torsion rod, a crank arm having a bearing socket surrounding said torsion rod adjacent said bearing block, a sleeve of a soft, resilient plastic material surrounding said torsion rod and having one part arranged in said cylindrical bore and another part arranged in said socket and another part extending along said torsion rod, means for clamping said last extending part of said sleeve to said torsion rod, means operatively connecting said crank arm to said one end of said torsion rod, and means pivotally connected to said crank arm and to said axle.

7. A vehicle spring suspension, comprising a frame, an axle having a wheel journaled thereon, a pair of bearing blocks mounted on said frame each formed to provide a cylindrical bore arranged coaxially with the axis arranged generally at right angles to said axle, a torsion rod having one end arranged in said bores, means mounted on said frame adjacent to and restraining the rotation of the opposite end of said torsion rod, a crank arm formed to provide two pairs of bearing sockets surrounding said torsion rod and each pair arranged on opposite sides of one of said bearing blocks, a continuous sleeve of a soft, resilient plastic material having parts compressed in each of said cylindrical bores against said torsion rod and having other parts compressed in each of said sockets against said torsion rod, means operatively connecting said crank arm to said one end of said torsion rod, and means pivotally connected to said crank arm and to said axle.

8. A vehicle spring suspension, comprising a frame, an axle having a wheel journaled thereon, a bearing mounted on said frame adjacent said axle with its axis extending generally at right angles to said axle, a torsion rod having one end directly journaled in said bearing and its extremity at said one end deformed into an out of round shape, means mounted on said frame adjacent to and restraining the rotation of the opposite end of said torsion rod, a crank arm having a bearing directly journaled on said torsion rod adjacent said axle, a socket member secured to one axial extremity of said crank arm and having a socket fitting the deformed extremity of said torsion rod, and means pivotally connected to said crank arm and to said axle.

9. A vehicle spring suspension, comprising a frame, an axle having a wheel journaled thereon, a pair of coaxial bearings mounted on said frame adjacent said axle in spaced relation to each other with the axis of said bearings extending generally at right angles to said axle, a torsion rod having one end directly journaled in said bearings, means mounted on said frame and restraining the rotation of the opposite end of said torsion rod, a crank arm having a pair of spaced bearings journaled on said torsion rod, each of said last pair of bearings being arranged in contact with a corresponding bearing of said first pair of bearings, means operatively connecting said crank arm to said one end of said torsion rod, and means pivotally connected to said crank arm and to said axle.

10. A vehicle spring suspension, comprising a frame, an axle having a wheel journaled thereon, a pair of bearing members mounted on said frame adjacent said axle in spaced relation to each other with the axis of said bearings extending generally at right angles to said axle, a bushing of soft, resilient, plastic material in each of said bearing members, a torsion rod having one end directly journaled in said bushings, means mounted on said frame and restraining the rotation of the opposite end of said torsion rod, a crank arm having a pair of spaced bearing sleeves journaled on said torsion rod, a bushing of soft, resilient, plastic material in each of said bearing sleeves and compressed around said torsion rod, each of said last bushings being arranged in contact with a corresponding bushing of said first pair of bearing members, means operatively connecting said crank arm to said one end of said torsion rod, and means pivotally connected to said crank arm and to said axle.

ALBERT F. HICKMAN.